May 31, 1955   L. R. KOLLER   2,709,765
ELECTROLUMINESCENT STRUCTURE
Filed Nov. 23, 1951

Inventor:
Lewis R. Koller,
by Paul A. Frank
His Attorney.

United States Patent Office 2,709,765
Patented May 31, 1955

2,709,765

ELECTROLUMINESCENT STRUCTURE

Lewis R. Koller, Schenectady, N. Y., assignor to General Electric Company, a corporation of New York Application November 23, 1951, Serial No. 257,752

6 Claims. (Cl. 313—108)

The present invention relates to the emission of light by the luminescence of a phosphor in a variable electric field. It is an object of my invention to provide a novel light-emitting unit in which the light-emitting medium consists of a film of suitably activated zinc sulfide.

The improved light-emitting unit provided by the present invention radiates light with greater brightness than luminescent emitters containing discrete grains which is at least in part due to the homogeneity of the light-emitting member as contrasted with electroluminescent emitters containing discrete grains embedded in a dielectric.

Advantageous operation also arises from the intensity of electric fields due to structural features which will be later more fully described.

Figure 1:
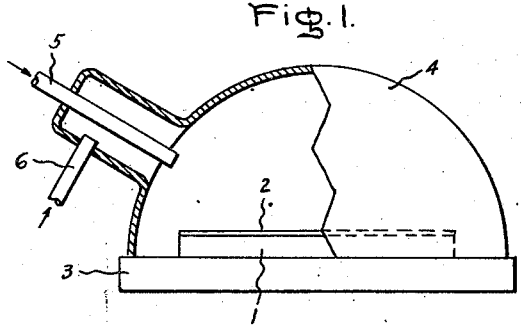
Figure 2:
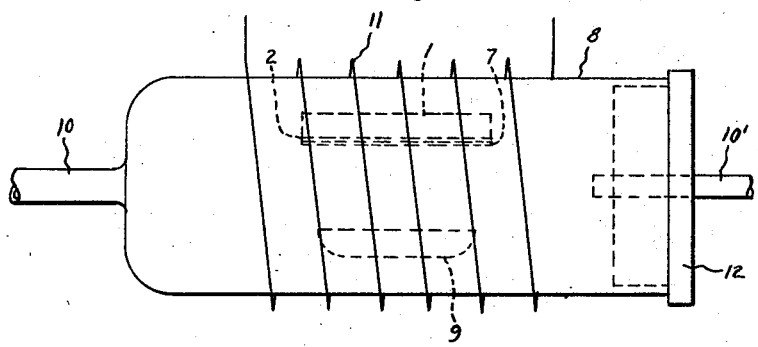
Figure 3:
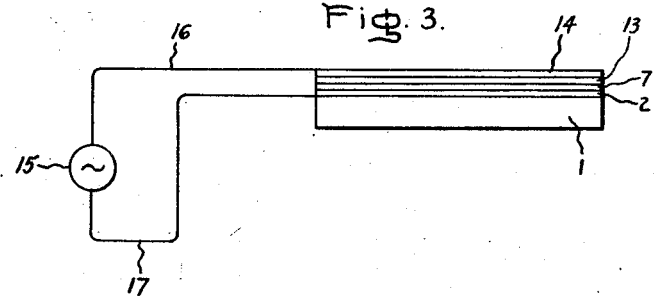

These and other features of my invention will be described in connection with the accompanying drawing in which Figs. 1 and 2 show diagrammatically apparatus for producing the novel luminescent unit and Fig. 3 shows conventionally in vertical section a luminescent unit illustrative of my invention.

As shown in Fig. 3 of the drawing, the supporting medium for a luminescent light radiator is represented diagrammatically as a plate 1 consisting of glass or other transparent material. The thickness of the plate is not a critical feature. As this member may have any desired geometric configuration, its representation in the drawing is conventional.

Upon the base 1 is deposited a thin layer 2 of transparent conducting material such as tin oxide or titanium dioxide. Conducting coatings of tin oxide are well known. Coatings of titanium dioxide may be made conducting in accordance wtih a method described in detail in Cusano and Studer application Serial No. 243,271, filed August 23, 1951, which is assigned to the same assignee as the present application. This method will be briefly described. A suitable layer of titanium dioxide may be formed by chemical interaction in a closed space of titanium chloride and water vapor which are brought into admixture with one another in close juxtaposition to the glass plate 1 while the latter is heated to about 150 to 200° C.

In Fig. 1 is shown a glass plate 1 supported on a hot plate 3 in a closed container 4. Interacting vapors of titanium chloride and water vapor are supplied through respective conduits 5 and 6. A film 2 of titanium dioxide is deposited on the plate 1 by their interaction. This film 2 may have a thickness of about one tenth of a micron but may be somewhat thicker.

Upon the film 2 is deposited a somewhat thicker layer 7 of a sulfide of zinc or of cadmium, or a mixed sulfide of zinc and cadmium. This film approximates in thickness one micron but is not of materially greater thickness. For such deposition, the glass plate coated with a film of titanium dioxide is brought into close contact within an envelope 8 with a heated mixture of vapor of zinc, or a zinc compound such as zinc chloride and a gaseous sulfur compound such as hydrogen sulfide gas. The vapor phase reaction is carried out under reducing conditions. Reducing conditions are established by hydrogen sulfide itself where this is the sulfur-containing compound used. A suitable zinc-containing vapor, for example, metallic zinc or zinc chloride associated with a minor component of activator is supplied in combination with the hydrogen sulfide or other suitable sulfur compound at reaction temperature under reducing conditions.

An activator, for example, manganese, copper, or silver, in small amount, as well known, should be associated with the phosphor.

As shown in Fig. 2 vaporization of zinc or a zinc compound may occur from a refractory container 9 within the glass envelope 8, heat being furnished in any convenient way as by an external electric resistor winding 11. The gaseous sulfur compound is admitted by a conduit 10, reaction products being discharged by a conduit 10' which passes through a cover 12.

By the deposition of the zinc sulfide layer, the titanium dioxide film 2 which originally has a high electrical resistance becomes lowered to about 4000 ohms per square or even to lower resistivity. The zinc sulfide itself deposited as a coating 7 is electrically conductive.

A layer of non-conducting material such as silicon monoxide is deposited by volatilization to overlie the zinc sulfide layer. The silicon monoxide may be volatilized from a boat-shaped electric heater (not shown) which is electrically heated in accordance with known procedure. The silicon monoxide is oxidized to the dioxide state by contact with oxygen or air when heated to form a coating 13 of transparent non-conductive silica. The silicon dioxide layer may have a thickness of about a tenth of a 'micron.

Lacquers, resins, and various non-conducting heat resistant plastics may be substituted for the silica layer.

Finally, a coating 14 of suitable conductive material having a thickness approximating one-tenth micron or of somewhat greater thickness is applied over the coating of silica. Conveniently, the conductive coating 14 consists of an easily volatilizable metal, as for example, aluminum, silver, gold or copper. Such metal is deposited by volatilization by well understood methods. Silver paste may also be used as the conducting layer.

When energy of alternating voltage from a source 15 is applied by the conductors 16 and 17 to the coatings 2 and 14 functioning as electrodes, luminescent light is emitted by the phosphor layer 7. The brightness of the light-emitting layer increases exponentially with the applied voltage.

At an impressed potential of 100 volts, the brightness of the emitting surface is about 8 foot-lamberts.

What I claim as new and desire to secure by Letters Patent of the United States is:

1. An electroluminescent cell comprising the combination of a continuous, non-granular, vapor-deposited conducting layer of activated zinc sulfide of the order of several microns thick, a transparent conducting layer in contact with one surface thereof, a superimposed vapor-deposited transparent non-conducting layer overlying the opposite surface of said zinc sulfide layer and a conducting layer external to the latter non-conducting layer.

2. An electroluminescent cell as claimed in claim 1 wherein the transparent conducting layer is composed of titanium dioxide.

3. An electroluminescent cell as claimed in claim 1 wherein the transparent non-conducting layer is composed of silicon dioxide.

4. The method of preparing an electroluminescent cell which comprises contacting a heated conducting surface with zinc vapor and a sulfur containing gas in the presence of a small quantity of vaporized phosphor activator, said zinc vapor and said gas reacting with each other to deposit a thin continuous conducting layer of activated zinc sulfide phosphor upon said surface, applying a thin layer of non-conducting material over said phosphor layer, and contacting said layer of non-conducting material with a conducting layer.

5. The method of preparing an electroluminescent cell which comprises contacting a heated transparent conducting surface with a metallic vapor selected from the group consisting of zinc, cadmium, and mixtures thereof, and a sulfur containing gas in the presence of a small quantity of vaporized phosphor activator said metallic vapor and said gas reacting with each other to deposit a thin continuous conducting layer of activated metallic sulfide phosphor upon said surface, applying a thin layer of silica over said phosphor layer, and contacting said layer of silica with a layer of conducting material.

6. An electroluminescent cell comprising the combination of a continuous, non-granular, vapor-deposited conducting phosphor layer of the order of several microns thick selected from the group consisting of activated zinc sulfide and activated cadmium sulfide, a transparent conducting layer in contact with one surface thereof, a superimposed vapor deposited transparent nonconducting layer overlying the opposite surface of said conducting phosphor layer, and a conducting layer external to the non-conducting layer.

References Cited in the file of this patent

UNITED STATES PATENTS

| | | |
|---|---|---|
| 1,930,149 | Pirani | Oct. 10, 1933 |
| 2,303,563 | Law | Dec. 1, 1942 |
| 2,459,633 | Farris | Jan. 18, 1949 |
| 2,462,517 | Leverenz | Feb. 22, 1949 |
| 2,559,279 | Charles | July 3, 1951 |
| 2,566,349 | Mager | Sept. 4, 1951 |
| 2,600,579 | Ruedy et al. | June 17, 1952 |
| 2,624,857 | Mager | Jan. 6, 1953 |

OTHER REFERENCES

G. Destriau: New Phenomenon of Electrophotoluminescence and its Possibilities for the Investigation of Crystal Lattice. Philosophical Magazine, October 1947, vol. 38, pgs. 700, 701, 702, 711, 712, 713, and 723, especially page 713.